United States Patent
Grois et al.

Patent Number: 5,701,382
Date of Patent: Dec. 23, 1997

[54] FIBER OPTIC ATTENUATOR

[75] Inventors: Igor Grois, Northbrook; Ilya Makhlin, Wheeling; Grigoriy Bunin, Skokie; Michael J. Pescetto, Plainfield, all of Ill.

[73] Assignee: Molex Incorporated, Lisle, Ill.

[21] Appl. No.: 676,028

[22] Filed: Jul. 5, 1996

[51] Int. Cl.[6] ................................ G02B 6/38
[52] U.S. Cl. ................ 385/140; 385/38; 385/73; 385/72
[58] Field of Search ............... 385/38, 140, 73, 385/49, 72

[56] References Cited

U.S. PATENT DOCUMENTS

| | | | |
|---|---|---|---|
| 3,803,511 | 4/1974 | Thompson | 331/94.5 |
| 4,639,078 | 1/1987 | Sheem | 350/96.21 |
| 5,066,094 | 11/1991 | Takahashi | 385/73 |
| 5,082,345 | 1/1992 | Cammons et al. | 385/73 |
| 5,109,468 | 4/1992 | Tamulevich et al. | 385/140 |
| 5,113,476 | 5/1992 | Okada et al. | 385/140 |
| 5,263,106 | 11/1993 | Rosson | 385/72 |
| 5,574,809 | 11/1996 | Watanabe et al. | 385/38 |

*Primary Examiner*—John Ngo
*Attorney, Agent, or Firm*—A. A. Tirva

[57] ABSTRACT

An optical fiber attenuator includes an optical fiber section having an end at an angle to the longitudinal axis of the section. The end has on it a first layer of substantially transparent anti-reflective material, a second layer of light attenuating material on the first layer and a third layer of substantially transparent anti-reflective material over the second layer. A fourth layer of substantially transparent, relatively hard scratch-resistant material may be added on the third layer.

11 Claims, 1 Drawing Sheet

FIBER OPTIC ATTENUATOR

1. Field of the Invention

This invention generally relates to the art of fiber optics and, particularly, to a fiber optic attenuator, along with a method of fabricating the attenuator.

2. Background of the Invention

In the optical fiber field, lightguide fibers are used in optical transmission systems wherein the fibers are connected end-to-end to transfer light or optical energy therebetween. The fibers often pass through connector assemblies which center the fibers and, preferably, provide low insertion losses. Eventually, the optical fiber is connected or terminated to some form of light detector which receives and utilizes the transferred light or optical energy.

Optical fiber transmission systems often require that the light or signal carried through the system be reduced or attenuated before it can be used. In other words, the amount of light may be too high for the sensitive detectors. In addition, different detectors have varying sensitivities. Therefore, the attenuation generally is carried out using either an attenuator that can be adjusted to provide the desired attenuation level or, in the alternative, by using an attenuator having a fixed, predetermined attenuation factor that is selected prior to use for the specific application or a specific detector. The latter type of attenuator often is referred to as a "fixed value fiber optic attenuator". Most fixed value attenuators currently used in fiber optic transmission systems rely on passive filters, air gaps, optical wedges and/or lenses to reduce the signal strength in the optical transmission lines. Such attenuators are complicated or, at least, relatively expensive.

In addition, most of the attenuators currently used in fiber optic transmission systems rely upon materials that provide a differing degree of attenuation for differing wave lengths of light. Thus, it becomes necessary to identify the wave lengths to be utilized in a system prior to selecting the specific material for the attenuator. This is time consuming and not cost effective. Still further, most of the prior art attenuators require extra parts and are not reliable under severe environmental conditions.

The present invention is directed to providing a simple, very effective and inexpensive fiber optic attenuator and method of fabrication which solves many of the problems or difficulties outlined above.

SUMMARY OF THE INVENTION

An object, therefore, of the invention is to provide a new and improved optical fiber attenuator and a method of fabricating the attenuator.

In the exemplary embodiment of the invention, a method of making an optical fiber attenuator includes the steps of applying a first coating of substantially transparent anti-reflective material to at least an end of an optical fiber. A second coating of light attenuating material is applied over the first coating. A third coating of substantially transparent anti-reflective material is applied over the second coating.

Preferably, a fourth coating of substantially transparent, relatively hard scratch-resistant material is applied over the third coating. Also, the coatings preferably are applied by a vacuum vapor deposition process.

As disclosed herein, the first and third coatings are applied of such material as titanium oxide. The second is applied of a material such as metal, e.g. aluminum or silver. In any event, the second coating should be a material insensitive to different light wave lengths. The fourth coating is applied of such material as quartz.

The method also contemplates fixing the optical fiber in a ferrule prior to applying the coatings. Preferably, the end of the optical fiber is formed, as by polishing, at an angle relative to its longitudinal axis prior to applying the coatings.

Still further, it is contemplated that the end of the optical fiber, with the coatings applied thereto, be abutted against the end of a second optical fiber also having the vacuum vapor deposited coatings applied thereto. Preferably, the ends of the coated optical fibers are abutted under pressure and fixed in that relationship. This can be accomplished by mounting the ends of the two fibers in abutting ferrules and fixing the ferrules in abutting relationship, as by mounting the ferrules in a sleeve with epoxy.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
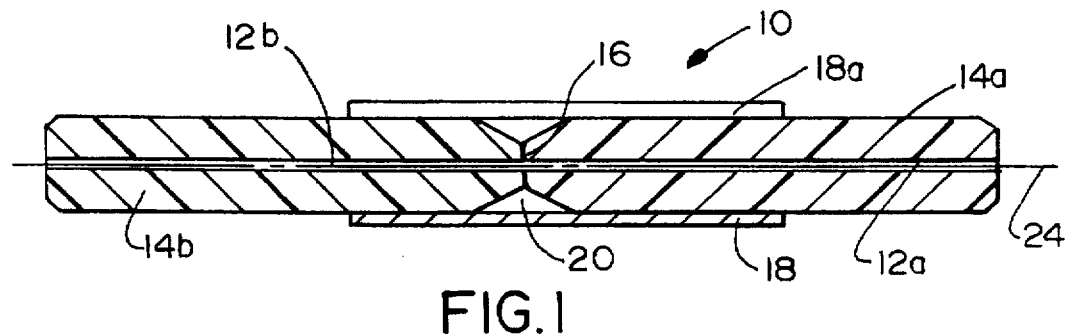
FIG. 1 is an axial section through an optical fiber attenuator according to the invention.

Referring to the drawings in greater detail, and first to FIG. 1, the invention is embodied in an optical fiber attenuator, generally designated 10, which includes two lengths or sections of fibers 12a and 12b fixed within a pair of ferrules 14a and 14b, respectively. The fibers are fixed within the ferrules by an adhesive. Adjacent ends of the ferrules and adjacent ends of the fibers abut at an interface 16. The ferrules and fibers are abutted under pressure and fixed in that relationship by mounting the adjacent ends of the ferrules in a sleeve 18 which is split at 18a. The forcibly abutted ferrules and fibers are fixed within the sleeve by an epoxy 20.

Figure 2:
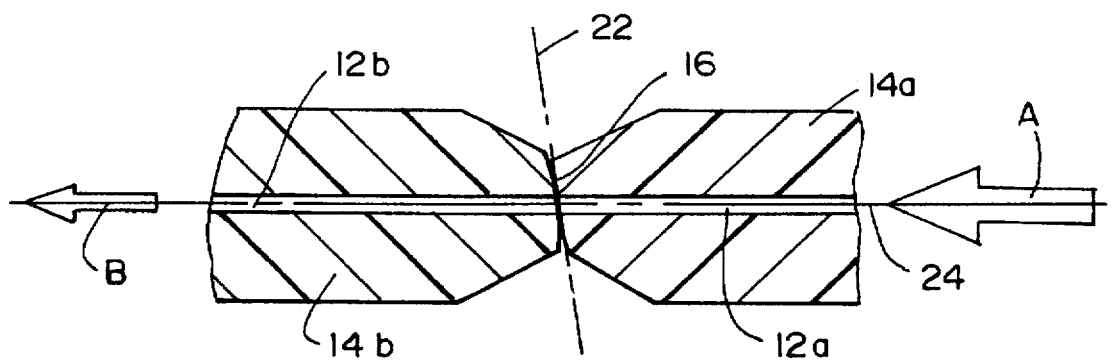
FIG. 2 is an enlarged axial section of just the abutting area of the ferrules and fibers.

Referring to FIG. 2 in conjunction with FIG. 1, it can be seen that interface 16 between the abutting ferrules and fibers is formed at an angle, as indicated by line 22, relative to the longitudinal axis 24 of the abutting fiber sections 12a and 12b. This angled interface limits "back-reflection" at the mating or abutting ends of the fiber sections.

Figure 3:
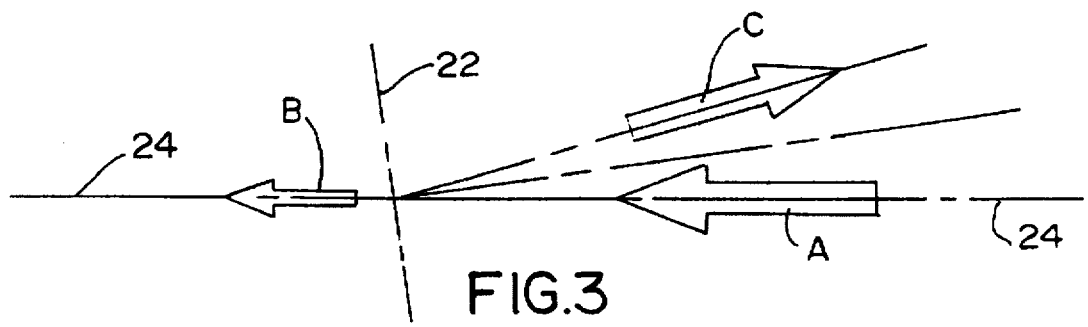
FIG. 3 is a schematic illustration of the reflective characteristics of the transmitted light.

In other words, referring to FIG. 3 in conjunction with FIG. 2, assume that incoming light enters fiber section 12a of the attenuator in the direction of arrow "A", and the light leaves fiber section 12b in the direction of arrow "B". Because of the angled interface 16, any reflected light at the interface will be deflected away from the axis of arrows "A" and "B", as indicated by reflected light arrow "C".

The invention contemplates fabricating optical fiber attenuator 10, by applying various layers to the abutting end of one or both of the fiber sections 12a and 12b. These layers or coatings preferably are applied by vacuum vapor deposition processes. Vacuum vapor deposition offers a number of advantages in fabricating an optical fiber attenuator, including the advantage of being very precise in application. In addition, the thickness of the deposited coating or layer can be varied simply by changing the length of time for performing the deposition (e.g. 5 seconds, 10 seconds, etc.). As stated in the "Background", above, it is necessary to vary the attenuation value of an optical fiber attenuator depending on the sensitivity of the light detector with which the fiber transmission system is used. Heretofore, different materials have been used to provide different degrees of attenuation, in addition to different materials for different wave lengths of light. By using a vacuum vapor deposition process, the degree of attenuation can be varied by varying the thickness of the attenuating layer or coating, and this is accomplished simply by varying the lengths of time in which the vacuum vapor deposition process is actuated.

Figure 4:
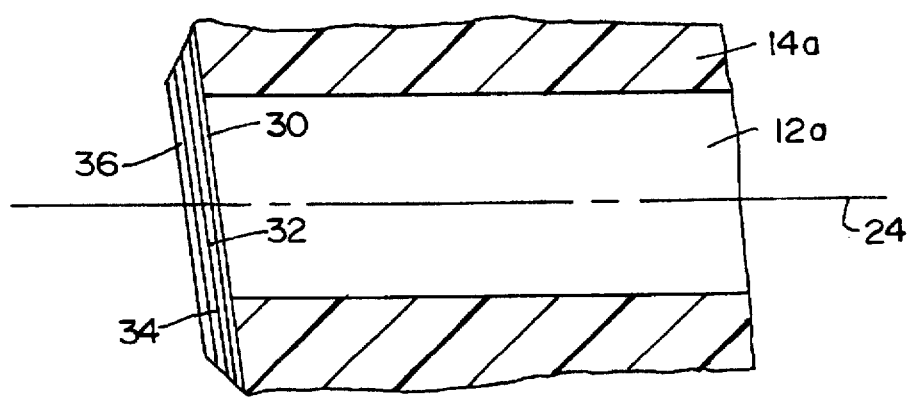
FIG. 4 is a fragmented axial section through the coated end of one of the fibers and the surrounding ferrule.

FIG. 4 shows fiber section 12a within ferrule 14a and with a plurality of layers applied to the end of the fiber section and somewhat overlapping onto the end of the ferrule. As stated above, the fiber section is fixed within the ferrule, as by an adhesive. The end of the fiber and/or the ferrule may be polished prior to applying the various coatings described below.

More particularly, the invention contemplates that a first coating 30 of substantially transparent anti-reflective material be applied to the end of optical fiber section 12a as seen in FIG. 4, such as by a vacuum vapor deposition process. An example of a material which can be used for this substantially transparent anti-reflective coating is titanium oxide.

A second coating 32 of light attenuating material is applied over first coating 30, such as by vacuum vapor deposition. This second coating must be neutral or insensitive to different wave lengths. Examples of materials that can be used for the second semi-transparent coating 32 are aluminum or silver. This second coating also should not include any color ingredient. Therefore, gold would not be desirable.

A third coating 34 of substantially transparent anti-reflective material is applied over second coating 32, such as by vacuum vapor deposition. This third, transparent anti-reflective coating is similar to first coating 30 and can comprise a material such as titanium oxide.

A fourth coating 36 of substantially transparent, relatively hard, scratch-resistant material is applied over third coating 34, such as by vacuum vapor deposition. This fourth coating is of a harder material than the other three coatings and may be of a material such as quartz to protect the underlying other coatings.

Preferably, coatings 30, 32, 34 and 36 also are applied to the abutting end of fiber section 12b prior to mounting ferrules 14a and 14b (along with their respective fiber sections 12a and 12b) into spilt sleeve 18. The ferrules and fibers then are abutted under axial pressure and fixed within split sleeve 18 by epoxy 20.

The completed optical fiber attenuator 10 then can be installed as a subassembly in-line with an appropriate optical fiber transmission system. The attenuator can be mounted in an appropriate housing, within an in-line connector assembly, or immediately in association with a detector, itself.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber attenuator, comprising:

an optical fiber section having an end;

a first layer of substantially transparent anti-reflective material located on said end of the optical fiber section;

a second layer of light attenuating material located on the first layer; and a third layer of substantially transparent anti-reflective material located on the second layer.

2. The optical fiber attenuator of claim 1, including a fourth layer of substantially transparent, relatively hard scratch-resistant material located on the third layer.

3. The optical fiber attenuator of claim 2 wherein said fourth layer comprises quartz.

4. The optical fiber attenuator of claim 1 wherein said first layer comprises titanium oxide.

5. The optical fiber attenuator of claim 1 wherein said second layer comprises as a metallic material.

6. The optical fiber attenuator of claim 5 wherein said second layer comprises aluminum or silver.

7. The optical fiber attenuator of claim 1 wherein said second layer comprises a material insensitive to different light wave lengths.

8. The optical fiber attenuator of claim 1 wherein said third layer comprises titanium oxide.

9. The optical fiber attenuator of claim 1, wherein said optical fiber section is fixed within a ferrule.

10. The optical fiber attenuator of claim 1, wherein the end of the optical fiber section is at an angle relative to its longitudinal axis.

11. The optical fiber attenuator of claim 1, wherein the end of the optical fiber section, with said layers on it, is in abutment with the end of a second optical fiber.

* * * * *